United States Patent
Dodd et al.

(10) Patent No.: US 6,981,089 B2
(45) Date of Patent: Dec. 27, 2005

(54) MEMORY BUS TERMINATION WITH MEMORY UNIT HAVING TERMINATION CONTROL

(75) Inventors: James M. Dodd, Shingle Springs, CA (US); Narendra S. Khandekar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 10/037,436

(22) Filed: Dec. 31, 2001

(65) Prior Publication Data

US 2003/0126338 A1    Jul. 3, 2003

(51) Int. Cl.$^7$ ............................................. G06F 13/36
(52) U.S. Cl. ...................... 710/308; 711/105
(58) Field of Search ................ 710/305, 308, 710/313; 711/5, 105; 713/320, 323; 365/52, 365/63, 230.03, 233

(56) References Cited

U.S. PATENT DOCUMENTS 5,604,714 A * 2/1997 Manning et al. ....... 365/230.08
6,304,502 B1 * 10/2001 Watanabe et al. ........... 365/201
6,349,051 B1 * 2/2002 Klein ........................... 365/63
6,496,945 B2 * 12/2002 Cepulis et al. ................ 714/25

OTHER PUBLICATIONS

AwardBIOS Set Up.*

* cited by examiner

Primary Examiner—Khanh Dang
(74) Attorney, Agent, or Firm—Marger Johnson & McCollom, P.C.

(57) ABSTRACT

Methods and apparatus for a memory system using line termination circuits in each memory unit (e.g., integrated circuit memory device) are disclosed. The memory unit contains termination control logic that sets the state of a controllable termination circuit to control reflections on the data bus. The termination control logic determines the proper state for the termination circuit from the state of its memory unit, and in some cases, from the approximate state of the data bus as gleaned from commands decoded from the command/address bus. A termination configuration register on the unit can be used to define the appropriate termination state for each unit state and/or data bus state.

28 Claims, 6 Drawing Sheets

US 6,981,089 B2

MEMORY BUS TERMINATION WITH MEMORY UNIT HAVING TERMINATION CONTROL

FIELD OF THE INVENTION

This present invention relates generally to digital memory devices and systems, and more particularly to data bus termination and data bus termination control for such devices and systems.

BACKGROUND OF THE INVENTION

Microprocessors, digital signal processors, digital imaging devices, and many other types of digital data processing devices rely on an attached high-speed memory system to hold data and/or processor instructions needed by the processing device. As these processing devices become faster and more powerful, the increased demands placed on them generally translate to a need for larger and faster attached memory systems.

FIG. 1 depicts a typical memory system configuration 20. A host processor 22 issues data store and retrieve requests to a memory controller 24 over a front-side bus FSB. Memory controller 24 acts as an intermediary for the exchange of data between processor 22 and memory units 26A, 26B, 26C, and 26D.

Typical memory systems have an address/command bus 28 and a separate data bus 30, each of which carries memory signals on a set of signal lines. Memory signals fall generally into one of several categories including clock and control signals, address signals, command signals, and data signals. Data signals carry the actual data that will be stored in, or retrieved from, a memory device, and pass across data bus 30. Address signals specify the location within a memory device where data is to be read from or written to. Command signals instruct a memory device as to what type of operation is to be performed, e.g., read, write, refresh, and possibly as to which of several access modes (such as a burst mode) should be used for a data transfer. Address/command bus 28 may have separate address lines and command lines, or addresses and commands may share a common set of lines and use temporal address/command separation. Clock and control signals synchronize the other signals passing between controller 24 and the memory devices. Four control signal lines are shown in FIG. 1—the chip select signal lines CSA, CSB, CSC, and CSD. When memory controller 24 places addresses and commands on bus 28, it asserts a chip select signal corresponding to the memory unit that it is targeting. The selected memory unit processes the command and performs the requested read or write command; the other units remain idle.

In the configuration shown in FIG. 1, data bus 30 is a multi-drop memory bus. In other words, bus 30 is arranged with a backbone of signal lines. A signal line stub, or "drop", connects each of the memory devices to the backbone, e.g., drops 30A, 30B, 30C, and 30D. Electrically, each stub or drop is a potential source of noise on data bus 30, as signal reflections from stubs connected to idle memory units can reach the intended recipient of a data transfer out-of-phase with the original signaling, increasing the probability that erroneous data will be sensed at the receiver.

As data bus speeds increase—even as logical voltage swings decrease in some cases—to increase memory capabilities, reflected signals become increasingly problematic. FIG. 2 shows one memory system implementation 40 that addresses this problem. Memory units 46A and 46B connect with controller 42 conventionally using an address/command bus 28, a data bus 30, and chip select signal lines CSA and CSB. Two additional control signal lines, TEA and TEB, can be asserted respectively to memory units 46A and 46B.

Each device communicating on bi-directional data bus 30 has a receiver/driver circuit (R/DA and R/DB, respectively, for memory units 46A and 46B, R/DC for controller 42) coupled to its stub of the data bus. In addition, each device has a termination circuit (TCA, TCB, TCC) coupled to its stub of the data bus. When enabled, each termination circuit absorbs signals propagating down its respective stub, thus diminishing the amount of energy reflected on that stub.

Termination control logic 44, residing within memory controller 42, controls the state of each termination circuit. For instance, when controller 42 is writing data to memory unit 46A, it asserts both TEA and TEB to enable termination circuits TCA and TCB. When controller 42 is reading data from memory unit 46A, it deasserts TEA and asserts TEB, and internally asserts TEC. Similar but reversed termination signaling occurs when memory unit 46B is the target device. This is but one example—TEA and TEB could be operated according to various other termination rules.

BRIEF DESCRIPTION OF THE DRAWING

The invention may be best understood by reading the disclosure with reference to the drawing, wherein.

DETAILED DESCRIPTION OF THE EMBODIMENTS

It is recognized herein that using the memory controller and dedicated control signal lines to directly control termination circuits on memory units can have disadvantages. Chief among these disadvantages is the need for additional signal lines on the motherboard and memory boards, pins on electrical connectors, drivers on the controller, a receiver on each memory device, and bonding pads on controller and memory device integrated circuits, all to serve the dedicated control signal lines for memory controller-based termination circuits.

The present disclosure describes a different approach to termination. Each memory unit or memory device incorporates controllable termination circuitry, but those units or devices also incorporate termination control logic to set the state of their own termination circuitry. Such an approach can generally provide needed termination without the point-to-point control lines required by the prior art.

Several terms have been assigned particular meanings within the context of this disclosure. A memory device is any device that contains addressable memory space that can be used to store and later retrieve digital data. A rank of memory devices is a collection of one or more devices addressable in parallel that, considered together, have a data path spanning the width of a data bus. A memory module is a removable memory unit carrying one or more ranks of memory devices. A memory unit can be a memory module, a rank of memory devices, or a single memory device, the unit being addressed together. A memory controller is a requesting device that has the capability to store/retrieve digital data to/from a memory unit using a bi-directional data bus. An address/command bus allows a memory controller to transmit requests to, e.g., read and write digital data to addressable locations in a memory unit's addressable memory space, the bus having the capability to serve more than one memory device or unit. A BIOS is a low-level operating system for a computer system, the BIOS generally defining the system hardware configuration and containing low-level software for initializing the computer system.

Figure 1:
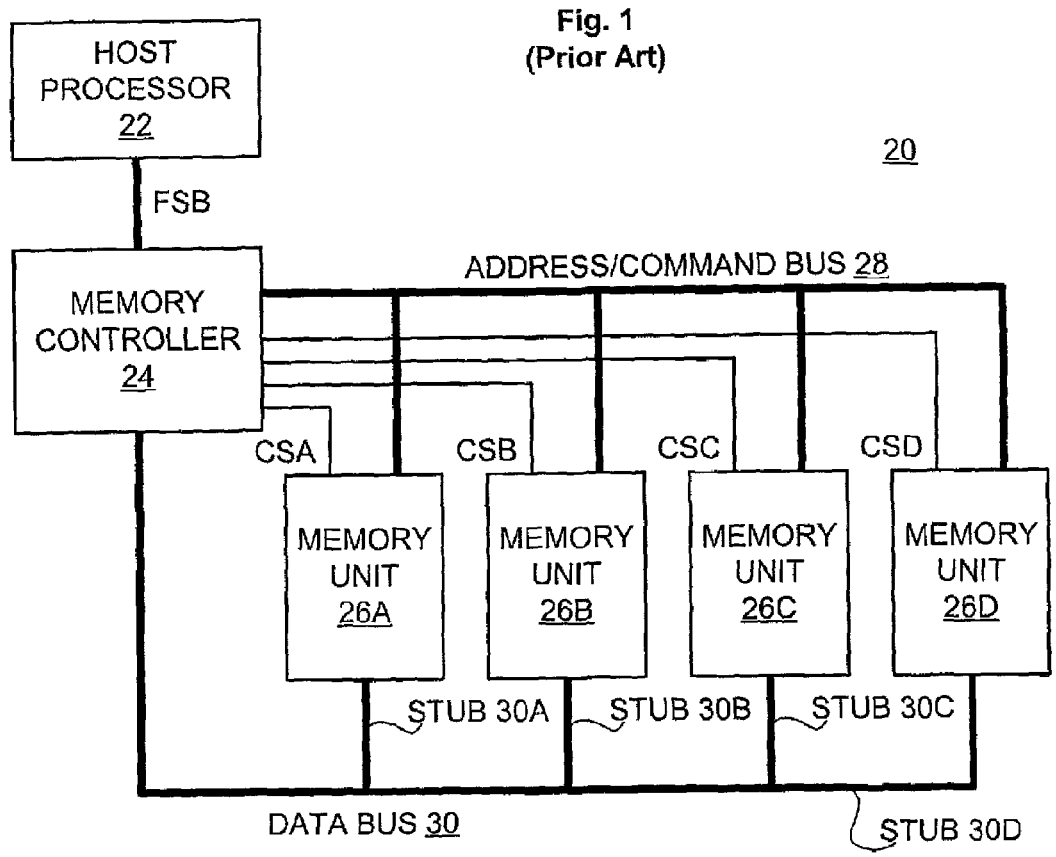
FIGS. 1 and 2 illustrate prior art memory systems.
Figure 2:
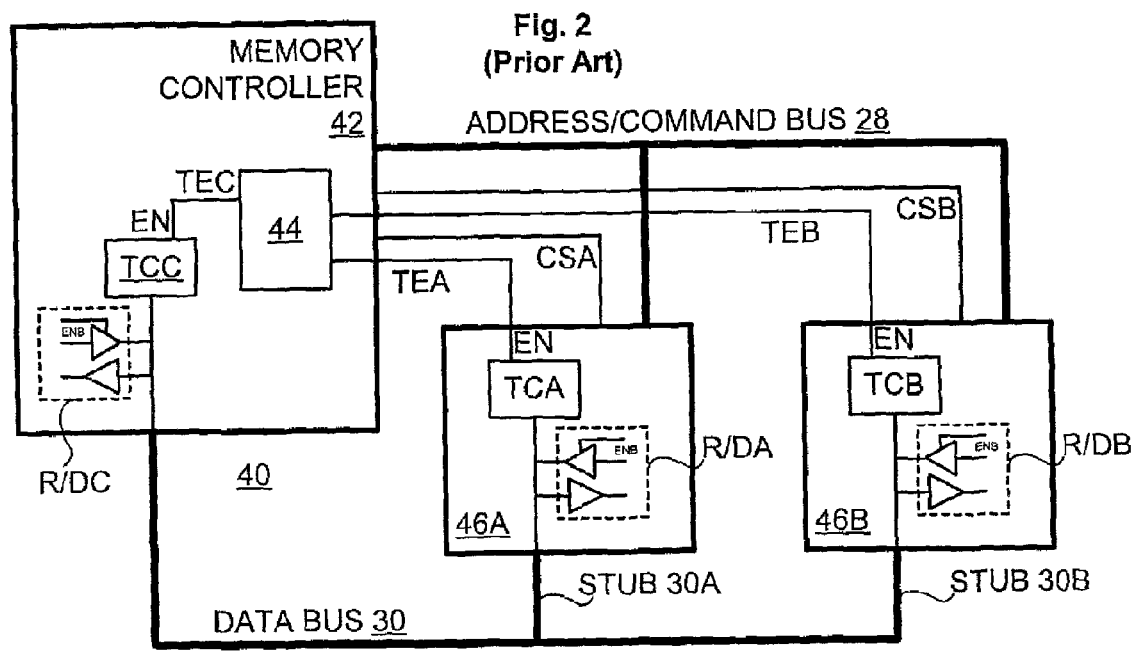
Figure 3:
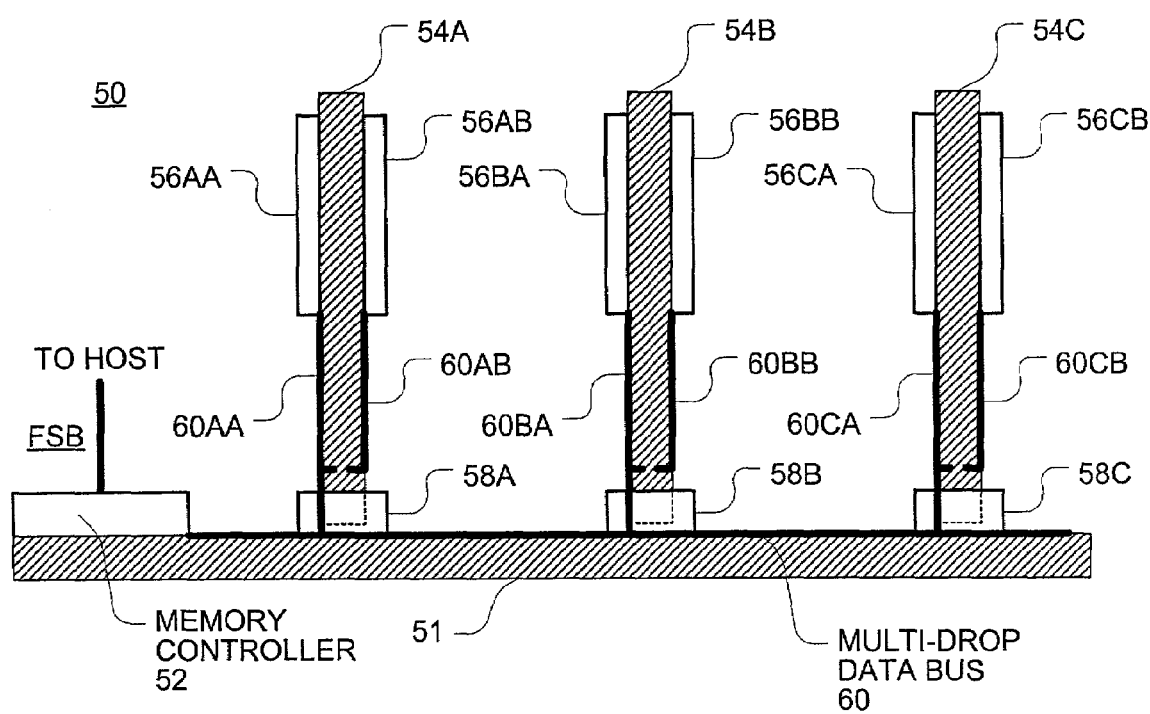
FIG. 3 shows a side view of a memory system capable of using an embodiment of the invention.

Although embodiments of the present invention can be embodied in a variety of memory systems, FIG. 3 is exemplary, and will thus be referenced herein. FIG. 3 shows a side view of a memory system 50 including a memory controller 52. A multi-drop data bus 60 comprises a collection of electrical traces routed on a printed circuit board 51 known as the "main board" or "motherboard". Memory controller 52 mounts to motherboard 51 and connects to one end of the traces comprising data bus 60. Each drop of data bus 60 connects to an electrical terminator, or socket. A typical main board contains multiple memory sockets, e.g., the three sockets 58A, 58B, and 58C shown in FIG. 3.

Memory is added to the memory system by inserting memory modules (e.g., 54A, 54B, 54C) into one or more of the sockets. One popular type of memory module is a Dual In-line Memory Module, or DIMM. The DIMM is a rectangular low-profile circuit board that has electrical contact points arranged on both sides along one long edge. The contact points form electrical connections to the main board's memory bus when the DIMM is inserted into a DIMM memory socket.

A DIMM generally has multiple individual memory devices mounted to it. The devices can all work in parallel to perform memory functions. For instance, a DIMM may have a rank of eight memory devices, each of which receives the same memory address from the controller. If the width of the data bus is 32 bits, each of the eight memory devices is responsible for four bits of the data word that is placed on the memory bus. The DIMMs depicted in FIG. 3 are dual-rank DIMMs, i.e., an "A" rank (56AA on module 54A) and a "B" rank (56AB on module 54A) of memory devices reside on the DIMM. The A rank and the B rank occupy logically separate areas of memory space, such that each rank can be addressed separately.

Each rank connects to a stub of the multi-drop memory bus. Thus stub 60AA connects rank 56AA to multi-drop data bus 60, and stub 60AB connects rank 56AB to multi-drop memory bus 60. Each rank of devices includes termination circuitry (not shown in FIG. 3) to terminate its stub of the multi-drop data bus 60.

Figure 4:
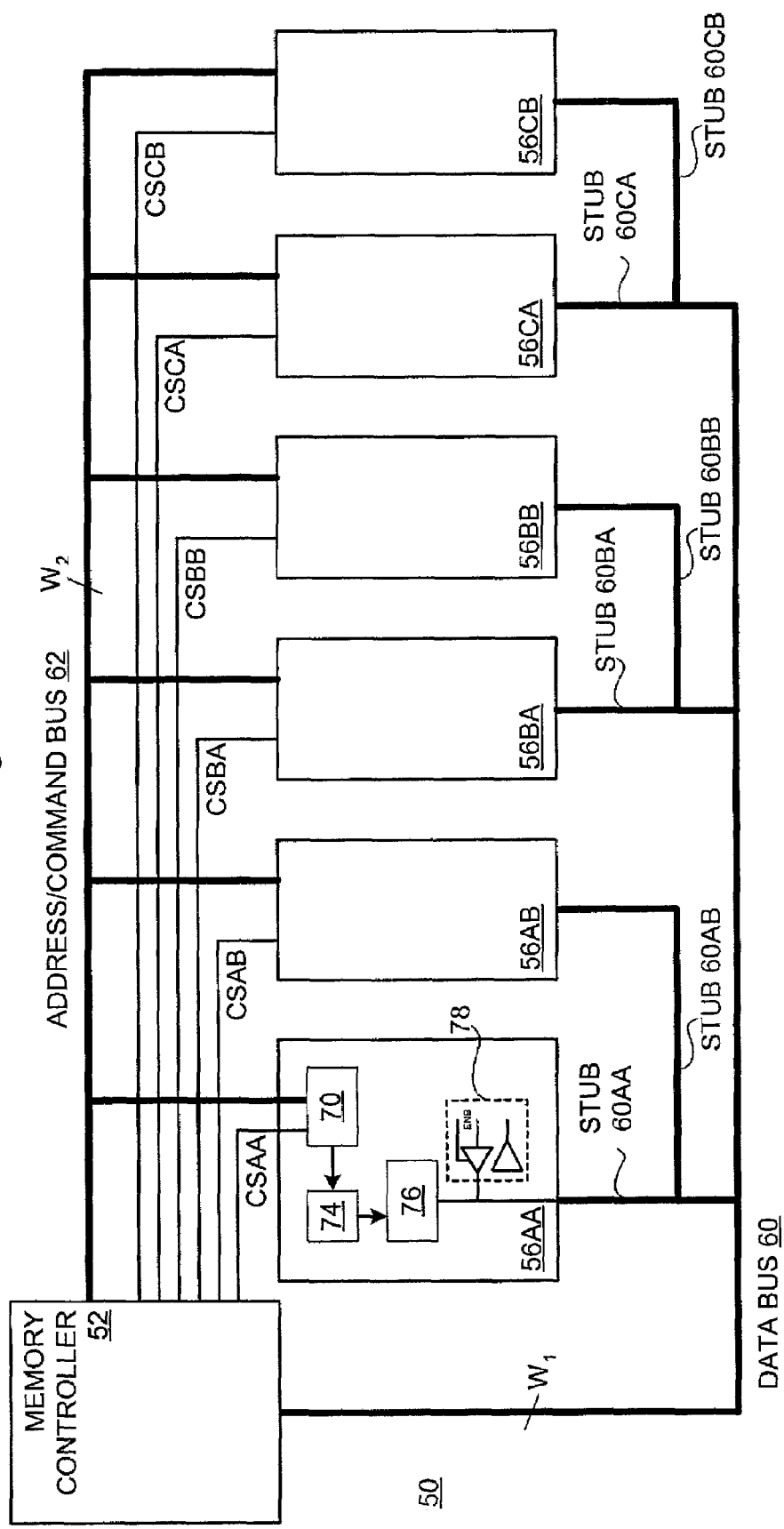
FIG. 4 contains a block diagram of the memory system of FIG. 3.

FIG. 4 shows a block diagram corresponding to the memory system of FIG. 3. FIG. 4 illustrates that data bus 60 is $W_1$ bits wide. FIG. 4 also shows a multi-drop address/command bus 62, $W_2$ bits wide, connecting memory controller 52 to each memory rank (although each rank is shown as a unit, it is noted that more than one device will typically form each rank). Finally, FIG. 4 shows six chip select signal lines, CSAA to CSCB, connected respectively to each of the memory ranks from controller 52.

Figure 5:
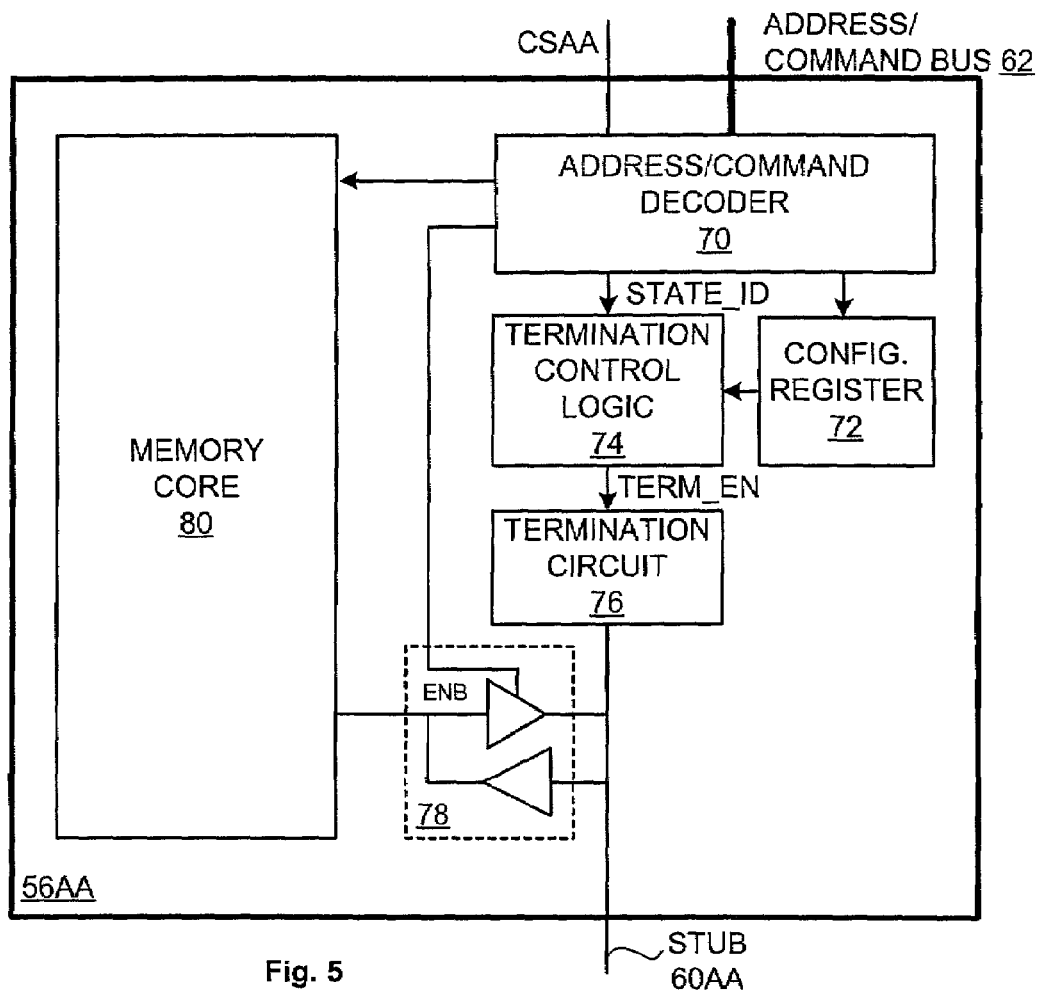
FIG. 5 contains a high-level block diagram of a memory device incorporating an embodiment of the invention.

FIG. 5 contains a block diagram for one of the memory ranks 56AA of FIG. 4 (the functionality shown in FIG. 5 may exist on each device of a multi-device rank). Memory core 80 contains an array of memory cells, row and column decoders, sense amplifiers, and other well-known circuitry central to a memory device but peripheral to the present invention—the details of core 80 have been omitted herein for clarity. Circuitry 78 comprises receivers and tri-state drivers forming a bi-directional data port that is capable of receiving data destined for the memory core, as well as transmitting data stored in the memory core, using data bus 60. Termination circuit 76 connects to the end of stub 60AA, within rank 56AA. Signal TERM_EN, supplied by termination control logic 74, determines whether termination circuit 76 is off or on.

Address/command decoder 70 receives address and command signaling from address/command bus 62, and a chip select signal from control line CSAA. Address/command decoder 70, in addition to its familiar functions in relation to the memory core and bi-directional data port, reports a state to termination control logic 74, as will be detailed shortly. In some embodiments, address/command decoder 70 has an additional function, i.e., it can set various termination control parameters within a programmable configuration register 72, e.g., in accordance with configuration commands transmitted over the address/command bus by the memory controller. When programmable configuration register 72 exists, the parameters stored therein are available for use by termination control logic 74.

In a first embodiment, address/command decoder 70 and termination control logic 74 implement a state-based control scheme for controlling termination circuit 76. Each memory device (or rank of devices) is assumed to be in one of three states: IDLE, READ, or WRITE. The IDLE state indicates that the memory device is not in the process of performing a read or write on the data bus. The READ state indicates that the memory device is performing (or is about to perform) a read in which port 78 will drive data back to the controller across the data bus. The WRITE state indicates that the memory device is performing (or is about to perform) a write in which port 78 will receive data from the controller across the data bus. Address/command decoder 70 can easily include these states into its control circuitry, particularly since it produces similar signals during read and write operations in order to coordinate the operation of the memory core and data port with the data bus timing defined by the memory controller.

Based on these three states, in a basic form termination control logic can set T_EN= READ#. Thus whenever the device is not in the READ state, termination circuit 76 will be enabled. This control scheme assumes that the data bus receivers can still discriminate 0 and 1 signals with all devices/ranks having their termination on (WRITE state) or with all but one rank having its termination on (READ state). Generally, since termination remains on even in the IDLE state, this implementation will also have high DC power dissipation.

Figure 6:
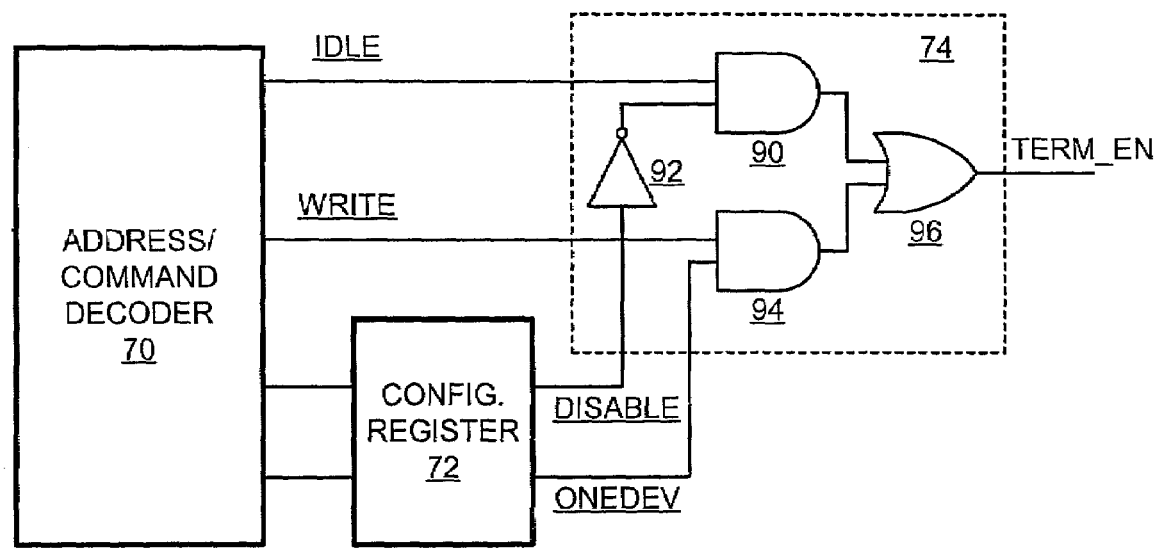
FIGS. 6 and 7 show termination control logic and register configurations useful with several embodiments of the invention.

More optimization can be obtained when configuration register 72 is used. For instance, a programmable DISABLE register bit can be used to disable termination on a device in the IDLE state. And a bit indicating whether this is the only device on the bus (ONEDEV) can be used to enable the termination circuit for writes, only if this is the only memory device on the bus. The termination control logic for such an implementation could, e.g., be as shown in FIG. 6. Address/command decoder 70 has the capability to set bits DISABLE and ONEDEV in configuration register 72. Decoder 70 also produces two signals that are asserted respectively during IDLE and WRITE states. Termination control logic 74 comprises AND gates 90 and 94, inverter 92, and OR gate 96. Inverter 92 inverts the disable bit from register 72. The output of inverter 92 and the IDLE state signal form inputs to AND gate 90—AND gate 90 asserts its output only in the IDLE state, and only if the DISABLE bit remains unset. The WRITE state signal and the ONEDEV bit from register 72 form inputs to AND gate 94—AND gate 94 asserts its output only in the WRITE state, and only if the ONEDEV bit is set. OR gate 96 asserts TERM_EN when either the output of gate 90 or the output of gate 94 is asserted.

In one configuration, ONEDEV and DISABLE remain unset on each memory rank. In this configuration, each IDLE device will have its termination enabled. The only device that will turn off its termination is a device in the READ or WRITE state.

In a second configuration, DISABLE could be set on selected ranks, such as ranks 56AA, 56BA, and 56CA. Those devices would thus never enable their termination circuits. Ranks 56AB, 56BB, and 56CB would enable their termination circuits except in the READ or WRITE state. This configuration would conserve power as compared to the first configuration, but the first configuration may be acceptable for a small number of ranks.

A variation on either of the first two configurations could set ONEDEV on one or more devices. With ONEDEV set, a device in the WRITE state will also have its termination on. In the second configuration, for example, ONEDEV could be set on the devices that have DISABLE unset. In the first configuration, ONEDEV could be set when only one rank is present in the system.

Figure 7:
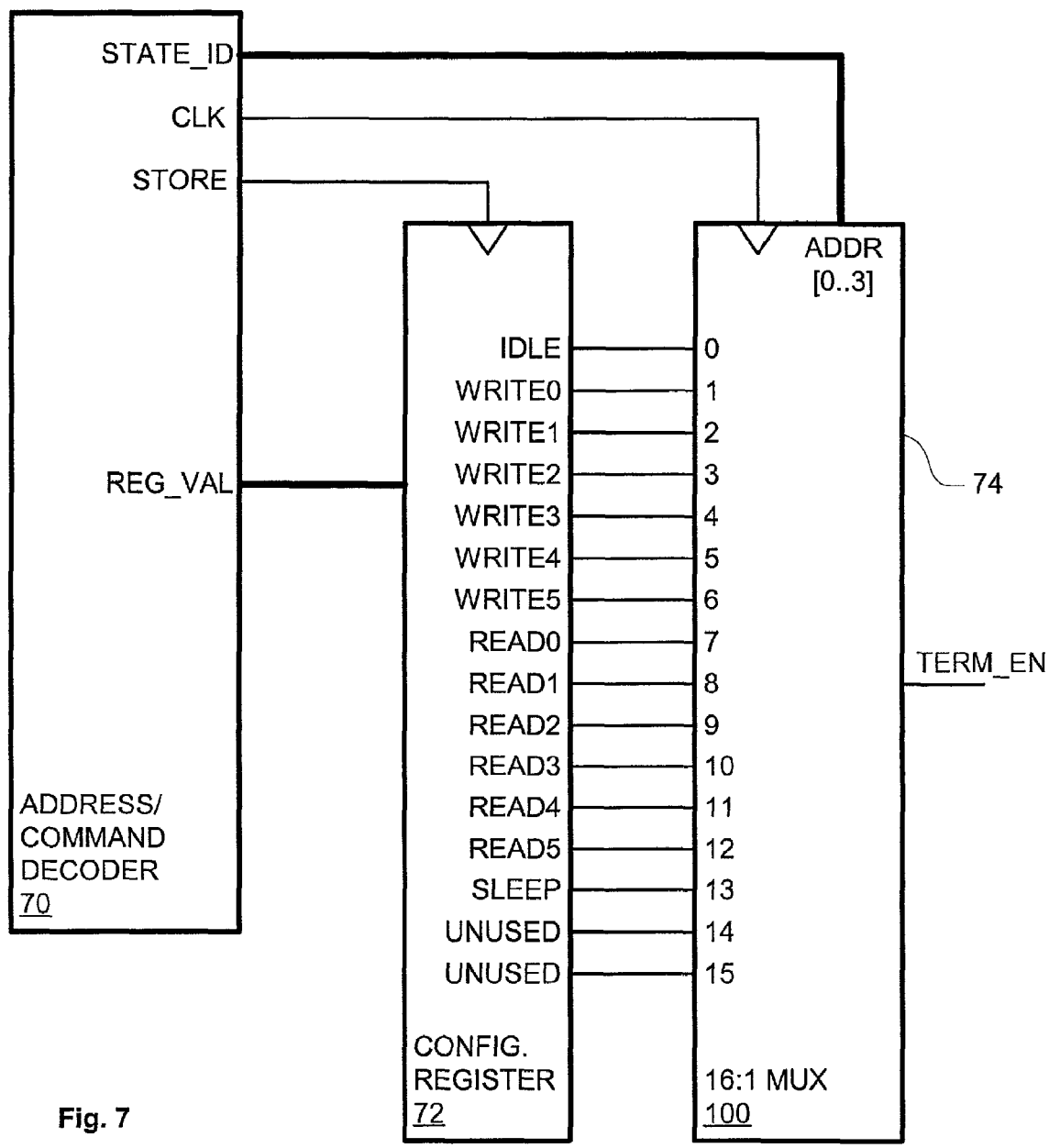

A second embodiment is illustrated in FIG. 7. In this embodiment, the memory controller embeds, within its address/command signals, information that identifies the memory unit, device, or rank selected for a particular read or write operation. For instance, with six ranks, six unique read commands (READn, where n identifies a rank between 0 and 5, inclusive) are defined. Likewise, six unique write commands, WRITEn, are defined. An address/command generator within the memory controller already determines which rank corresponds to a memory address supplied by a requesting host, in order to enable the proper chip select line. This determination can be used as well to select the READn command corresponding to the rank, and transmit READn instead of a generic READ.

The address/command decoder on each memory device decodes each read or write command issued by the memory controller, regardless of whether chip select has been asserted for that device. Thus for the third of six ranks, READ2 would correspond to a read of that rank. All six ranks would decode the READ2 command and report a corresponding device state to their respective termination control logic.

In FIG. 7, termination control logic 74 comprises a multiplexer 100, addressable by STATE_ID supplied from decoder 70. Configuration register 72 stores a bit for each state, and the bit register outputs connect respectively to the inputs of multiplexer 100. In the example above where a READ2 command was issued, decoder 70 would set STATE_ID to 1001 binary, corresponding to the tenth register value and multiplexer input 9. Decoder 70 then asserts CLK to switch the READ2 register output from multiplexer input 9 to the multiplexer output TERM_EN. When the state changes again, a new STATE_ID is set and TERM_EN changes accordingly.

A number of options are available for setting the value of register 72. In one preferred embodiment, the memory controller issues a command SET_TREG to each memory device during initialization, and any other time that a different register value is needed. The address sent with the SET_TREG command is the register value to be set. When an address/command decoder receives the SET_TREG command while selected, it places the received register value on the input REG_VAL to register 72 and strobes STORE to set the new register value.

Instead of having the memory controller include logic that can set optimal configuration register values for each possible memory configuration, one embodiment uses a computer's BIOS (Basic Input/Output System) to set the configuration register values. The BIOS contains a basic set of executable instructions for low-level hardware operation in some computing systems. When used, the BIOS is typically embodied in a read-only memory (ROM), flash electrically erasable ROM, or similar nonvolatile memory apparatus. In this particular embodiment, the computer instructions in the BIOS cause initialization of the configuration registers in the memory ranks with values that are appropriate for the sensed memory configuration. Simple BIOS routines can evaluate the number of memory ranks presently installed in the system, and determine an appropriate set of the ranks that should activate their termination circuits as each rank is accessed. This determination is translated into a register value for each rank; the host executing the BIOS instructions then instructs the memory controller to write the register values to their respective memory rank's registers.

Alternately, each memory device can be fabricated with a preset value that is stored in register 72 upon power-up or a change in actual or perceived memory state. Different preset values can exist, each of which depends on the number of active ranks in the system and this device's place in the ranks. The memory controller can explicitly instruct each rank as to number of ranks and that rank's place; or, the address/command decoder can discover these values from the commands that it decodes.

In FIG. 7, one of the register bits corresponds to a SLEEP state. In a preferred embodiment, the SLEEP state can be used to turn off line termination to conserve power when no memory access is occurring. The SLEEP state can be entered when the memory controller issues a SLEEP command to all banks; alternately, the termination control logic could transition to SLEEP state automatically after a preset number of clock cycles with no activity on the address/command bus.

Simple logic similar to that of FIG. 6 is also envisioned for use with READn and WRITEn commands. The IDLE state of FIG. 6 can be replaced with states READ_OTHER and WRITE_OTHER, specifying that a read or write operation is occurring on another device. Appropriate logic gates can then set TERM_EN as desired for READ, READ_OTHER, WRITE, WRITE_OTHER, and possibly other states such as IDLE and SLEEP.

Figure 8:
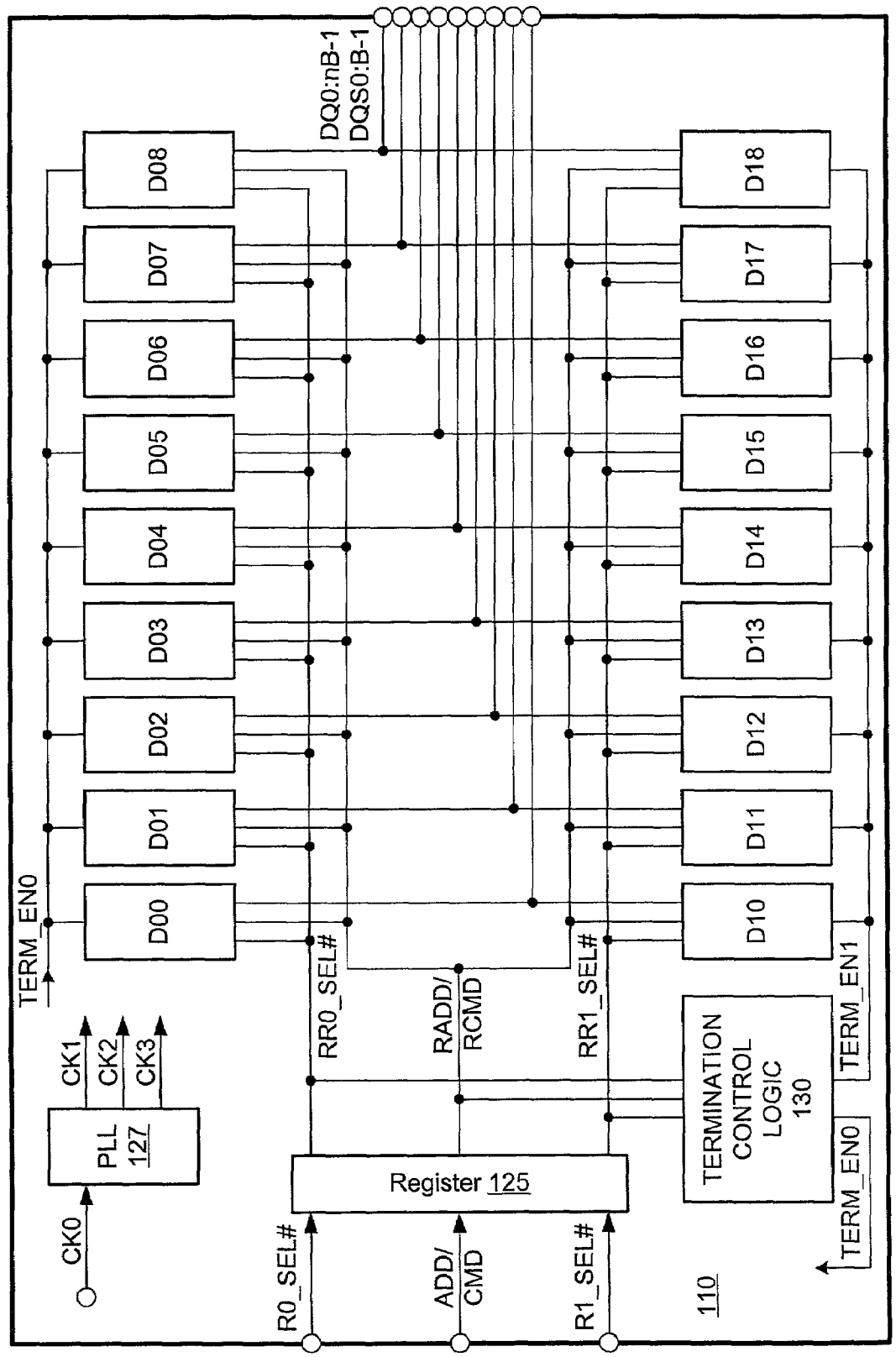
FIG. 8 shows the block diagram for a registered DIMM incorporating an embodiment of the invention.

Although many embodiments place the termination control logic and termination circuitry directly on individual memory devices, other implementations are also possible. For example, FIG. 8 shows a block diagram of a registered DIMM 110 containing eighteen memory devices arranged in two ranks, one rank containing devices D00–D08 and the other containing devices D10–D18. In a typical registered DIMM, the system clock CK0 is received by phase-locked-loop (PLL) 127, which creates a set of module clock signals. Address and command signals ADD/CMD are latched into a register 125 at the edge of one clock cycle, and then redriven onto the module addressing/command bus as register signals RADD/RCMD on the following clock cycle. Note that two rank select signals, R0_SEL# and R1_SEL#, each pass through register 125 and connect to the chip select pins on a corresponding one of the ranks of memory devices.

The data lines DQ of the memory device ranks each connect to the memory bus of the host system. A total of nB DQ lines carry data signals, where B is the number of devices in one rank (e.g., eight or nine), and n is the data width of each device (e.g., four, eight, or sixteen bits). In addition, B DQS lines carry data strobes (one per device). The DQS data strobes travel with the data signals, and can be used for source-synchronous clocking of the data signals at the receiver.

In FIG. 8, termination control logic 130, which could be integrated with register 125, snoops the RADD/RCMD and registered rank select signals. The termination control logic determines a state for each rank from the snooped signals, and uses logic configurations similar to those previously disclosed, along with configuration registers as needed, to generate two termination enable signals TERM_EN0 and TERM_EN1. The termination circuitry is implemented as before on the memory devices, each rank of devices having its termination circuitry controlled by a respective termination enable signal from logic 130.

The device embodiments described above that use READn-type commands preferably only approximately track the state of other memory devices. For instance, the embodiments may not calculate the exact length that a READn or WRITEn operation should take, but may simply switch to that state until another bus command switches the state again. Within the same spirit, the READn and WRITEn commands need not correspond 1:1 with memory ranks in every embodiment; for instance, system employing two-rank DIMMs could merely equate n with the DIMM memory slot; both ranks on DIMM n could determine whether or not they are the selected rank from their chip select. Also, commands that do not involve data bus transfers may be largely ignored in setting termination state with little or no loss in functionality. These approximations do not mean, however, that more complex logic could not be used in an embodiment of the invention to more specifically determine the state of the memory system from decoded commands.

One possible beneficial side effect of READn and WRITEn embodiments is that, where n does correspond to a device rank, such commands could be issued without asserting the corresponding chip select signal. This could in some systems enable faster bus turnaround time if data transfer is occurring to one rank while another rank is being prepared for data transfer.

Except for the possible side effect noted above, the embodiments described herein need not change the timing of a memory system. As the timing of the control logic within the embodiments is well within the skill of those implementing memory-timing systems, and the margin for error in changing termination state is relatively large, timing diagrams have not been presented herein.

The types, speeds, sizes, or numbers of memory devices selected for use with the present invention are not critical, although these parameters may impact the line termination strategy employed. Some possible device types include dynamic random access memory (DRAM) devices, synchronous DRAM (SDRAM) devices including double-data-rate (DDR) SDRAM devices, quad-data-rate (QDR) SDRAM devices, static RAM, optical RAM or ROM, and flash memory devices. Registered DIMM configurations are but one example of a memory device configuration—just about any controller/memory bus configuration could incorporate an embodiment of the invention.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Reading and writing configuration registers need not use command/address pins; some alternatives include the use of data pins for configuration, and/or the use of dedicated configuration pins. Although multiplexer and logic gate implementations for control logic are illustrated, those skilled in the art recognize that many, many equivalent configurations using other logic gates, registers, and other digital logic can be used to set termination state based on a supplied state and register settings. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A memory system comprising:
an address/command bus;
a multidrop data bus having a predetermined number of data signaling lines;
a memory controller to transmit address and command signals on the address/command bus, and to transmit and receive data signals on the multidrop data bus corresponding to the address and command signals;
first and second memory units, each connected to both the address/command bus and the multidrop data bus, at least the second memory unit comprising controllable termination circuitry having on and off states and coupled to the multidrop data bus and termination control logic to set the state of the termination circuitry according to decoded commands received on the address/command bus;
wherein each memory unit comprises a programmable configuration register to configure the termination control logic according to stored termination control parameters, the memory controller having a termination configuration mode for transmitting termination control parameters to each of the memory units separate from the decoded commands for storage in that unit's configuration register.

2. The memory system of claim 1,
wherein the memory controller comprises a command generator capable of generating command signals for a first READ command type when requesting that the first memory unit retrieve data, and command signals for a second READ command type when requesting that the second memory unit retrieve data, the second memory unit having the capability to decode command signals for both the first READ and second READ command types, the second memory unit also having the capability to turn its termination circuitry off in response to receiving a READ) command of the second type and turn its termination circuitry on in response to receiving a READ command of the first type.

3. The memory system of claim 2, wherein the first memory unit has termination circuitry, termination control logic, and READ command decode capability similar to that recited for the second memory unit, the first memory unit having the capability to turn its termination circuitry on in response to receiving a READ command of the second type and turn its termination circuitry off in response to receiving a READ command of the first type.

4. The memory system of claim 1, capable of supporting a variable number of memory units each having the claimed programmable configuration register, wherein the termination control parameters transmitted are dependent on the number of active memory units as part of the termination control parameters.

5. The memory system of claim 1, wherein each memory unit comprises a rank of memory devices, each device in the rank serving a subset of the data bus signaling lines, each memory device having a termination circuit for the data bus signaling lines that it serves, each memory device having termination control logic integrated therein to control that device's termination circuit according to decoded command signals received on the address/command bus.

6. The memory system of claim 5, wherein each memory unit resides on a memory module.

7. The memory system of claim 5, wherein two memory units reside on a memory module.

8. A memory device comprising:
a memory cell array;
a bi-directional data port capable of receiving data for and transmitting data stored in the memory cell array;
an address and command port;
a controllable line termination circuit to terminate signals at the data port, the circuit having on and off states;
an address and command decoder to receive signals at the address and command port;
termination control logic coupled to the address and command decoder to set the state of the termination circuitry according to decoded commands from the decoder; and
the device further having a set device ID, wherein the address and command decoder is capable of decoding signals for multiple READ command types, one of which corresponds to the set device ID, the others corresponding to READ commands for other device IDs, the address and command decoder decoding all READ command types but initiating a READ operation only when the received command type corresponds to the set device ID.

9. The memory device of claim 8, wherein the address and command decoder is capable of reporting each READ command type, when received, to the termination control logic, the termination control logic setting the termination circuit state according to the READ command type.

10. The memory device of claim 8, further comprising a register to store parameters for use by the termination control logic.

11. A method of operating a memory device comprising:
terminating an external data bus on the memory device with a controllable line termination circuit having on and off states;
monitoring a state of the memory device;
setting a state of the line termination circuit based on the state of the memory device;
decoding read and write commands received from an external memory controller, even when the memory device is not selected for reading or writing by the controller; and
interpreting from the decoded commands a state of the data bus including determining which of several devices on the data bus is the most current target of a memory read or write transaction, wherein setting the state of the line termination circuit is dependent on which device is the most current target and the type of transaction; and wherein setting the state of the line termination circuit is further based on the state of the data bus.

12. The method of claim 11, further comprising storing line termination parameters, wherein setting the state of the line termination circuit is further based on a state of parameters contained within a memory.

13. The method of claim 11, wherein interpreting the state of the data bus comprises identifying which of several distinguishable read or write commands was received, each of the distinguishable read or write commands corresponding to one of the devices on the data bus.

14. The method of claim 11, further comprising storing line termination parameters indicative of the number of memory devices sharing the data bus and this memory device's place among those memory devices, and using these parameters along with the determination of which of several devices on the data bus is the current target to set the state of the line termination circuit.

15. The method of claim 14, wherein when this memory device is the only memory device sharing the data bus, the method further comprises disabling the line termination circuit.

16. The method of claim 11, further comprising storing a line termination parameter that, when set, disables the line termination circuit regardless of other state information.

17. A method of operating a memory system having a memory controller and at least two memory units, all connected to a command/address bus and a multidrop data bus, the method comprising:
the memory controller indicating on the command/address bus, when issuing a read or write command to one of the memory units, which memory unit is the target of the command;
each memory unit decoding the issued read or write command; and
each memory unit setting the state of line termination circuitry, having on and off states, based on the decoded command, where the termination circuitry to absorb signals on the multidrop data bus responsive to the state;
wherein said read or write command indicates the target of the command;
wherein each memory unit also bases setting the state of line termination circuitry on internal parameters unique among the memory units to that unit, and the memory controller transmitting at least some of the internal parameters to one of the memory units during an initialization routine, the internal parameters including the number of memory devices Present in the system and the position of that memory unit in the system.

18. The method of claim 17, the transmitted parameters including parameters corresponding to the termination state that the memory unit is to enable for specific read and/or write commands.

19. The method of claim 17, wherein the at least two memory units receive a first type of READ command indicating that the first memory unit retrieve data, and the at least two memory units receive a second type of READ command indicating that the second unit retrieve data.

20. The method of claim 19, further wherein the second memory unit turns off its termination circuitry in response to a READ command of the first type, and turns on its termination circuitry in response to a READ command of the second type.

21. The method of claim 20, further wherein the first memory unit turns off its termination circuitry in response to a READ command of the second type, and turns on its termination circuitry in response to a READ command of the first type.

22. A memory system comprising:
an address/command bus;
a multidrop data bus having a predetermined number of data signaling lines;
a memory controller to transmit address and command signals on the address/command bus, and to transmit and receive data signals on the multidrop data bus corresponding to the address and command signals;
first and second memory units, each connected to both the address/command bus and the multidrop data bus, at least the second memory unit comprising controllable termination circuitry having on and off states and coupled to the multidrop data bus, and termination control logic to set the state of the termination circuitry according to decoded commands received on the address/command bus; and
wherein each memory unit comprises a rank of memory devices, each device in the rank serving a subset of the data bus signaling lines, each memory device having a termination circuit for the data bus signaling lines that it serves, each memory device having termination control logic integrated therein to control that device's termination circuit according to decoded command signals received on the address/command bus.

23. The memory system of claim 22, wherein each memory unit resides on a memory module.

24. The memory system of claim 22, wherein two memory units reside on a memory module.

25. A memory system comprising:
an address/command bus;
a multidrop data bus having a predetermined number of data signaling lines;
a memory controller to transmit address and command signals on the address/command bus, and to transmit and receive data signals on the multidrop data bus corresponding to the address and command signals;
first and second memory units, each connected to both the address/command bus and the multidrop data bus, at least the second memory unit comprising controllable termination circuitry having on and off states and coupled to the multidrop data bus, and termination control logic to set the state of the termination circuitry according to decoded commands received on the address/command bus; and
wherein the memory controller comprises a command generator capable of generating command signals for a first READ command type when requesting that the first memory unit retrieve data, and command signals for a second READ command type when requesting that the second memory unit retrieve data, the second memory unit having the capability to decode command signals for both the first READ and second READ command types, the second memory unit also having the capability to turn its termination circuitry off in response to receiving a READ command of the second type and turn its termination circuitry on in response to receiving a READ command of the first type.

26. The memory system of claim 25, wherein the first memory unit has termination circuitry, termination control logic, and READ command decode capability similar to that recited for the second memory unit, the first memory unit having the capability to turn its termination circuitry on in response to receiving a READ command of the second type and turn its termination circuitry off in response to receiving a READ command of the first type.

27. A method of operating a memory system having a memory controller and at least two memory units, all connected to a command/address bus and a multidrop data bus, the method comprising:
the memory controller indicating on the command/address bus, when issuing a read or write command to one of the memory units, which memory unit is the target of the command;
each memory unit decoding the issued read or write command;
each memory unit setting the state of line termination circuitry, having on and off states, based on the decoded command;
wherein said read or write command indicates the target of the command; each memory unit also bases setting the state of line termination circuitry on internal parameters unique among the memory units to that unit; and
the memory controller transmitting at least some of the internal parameters to one of the memory units during an initialization routine, the internal parameters including the number of memory devices present in the system and the position of that memory unit in the system.

28. The method of claim 27, the transmitted parameters including parameters corresponding to the termination state that the memory unit is to enable for specific read and/or write commands.

* * * * *

UNITED STATES PATENT AND TRADEMARK OFFICE
CERTIFICATE OF CORRECTION

PATENT NO. : 6,981,089 B2  Page 1 of 1
APPLICATION NO. : 10/037436
DATED : December 27, 2005
INVENTOR(S) : Dodd et al.

It is certified that error appears in the above-identified patent and that said Letters Patent is hereby corrected as shown below:

At column 8, line 57, please replace "READ)" with --READ--

At column 10, line 50, please replace "device Present" with --device present--

Signed and Sealed this

Eleventh Day of July, 2006

JON W. DUDAS
*Director of the United States Patent and Trademark Office*